US010026078B1

(12) United States Patent
Nolan

(10) Patent No.: US 10,026,078 B1
(45) Date of Patent: Jul. 17, 2018

(54) SYSTEM AND METHOD FOR ACCESSING MULTIPLE ACCOUNTS

(75) Inventor: Joseph Bradley Nolan, New Albany, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 1213 days.

(21) Appl. No.: 13/094,314

(22) Filed: Apr. 26, 2011

(51) Int. Cl.
G06Q 40/00 (2012.01)
G06Q 20/36 (2012.01)
G06Q 20/40 (2012.01)
G06Q 20/32 (2012.01)
G06Q 20/34 (2012.01)
G06F 3/08 (2006.01)
A63F 9/24 (2006.01)

(52) U.S. Cl.
CPC ............. *G06Q 20/36* (2013.01); *G06F 3/08* (2013.01); *G06Q 20/32* (2013.01); *G06Q 20/3572* (2013.01); *G06Q 20/405* (2013.01); *A63F 2009/2429* (2013.01)

(58) Field of Classification Search
None
See application file for complete search history.

(56) References Cited

U.S. PATENT DOCUMENTS

| 6,631,849 | B2 | 10/2003 | Blossom |
| 7,163,153 | B2 | 1/2007 | Blossom |
| 7,191,952 | B2 | 3/2007 | Blossom |
| 7,357,331 | B2 | 4/2008 | Blossom |
| 7,591,416 | B2 | 9/2009 | Blossom |
| 8,341,083 | B1 * | 12/2012 | Jain ................................ 705/41 |

(Continued)

OTHER PUBLICATIONS

Citibank (South Dakota), "The Second Generation of Credit Cards is Here", webpage printed Feb. 4, 2011 at http://creditcards.citicards.com/usc/10/2g/ph1/default.htm?BT_TX=1&ProspectID=E52B456CC5F246DC . . . , (2011), (2 Pages).

(Continued)

*Primary Examiner* — Rajesh Khattar
(74) *Attorney, Agent, or Firm* — Hunton Andrews Kurth LLP

(57) ABSTRACT

The invention relates to a system and method for accessing multiple accounts. According to one embodiment, the system includes an access device comprising a body in the form of a card; a processor housed in the body; a memory housed in the body and connected to the processor, wherein the memory stores information on the multiple accounts; a selection device housed in the body and adapted to allow a user to select one of the multiple accounts; a display housed in the body for displaying information identifying the selected account, wherein the processor is programmed to generate a signal to generate the information identifying the selected account in response to a user selecting one of the multiple accounts using the selection device; and a wireless transmitter and a wireless receiver housed in the body and connected to the processor. The system may also include a server that communicates with the access device and with the user, wherein the server communicates with a second wireless transmitter and second wireless receiver that communicate wirelessly with the access device, and the server is adapted to send and receive electronic signals over network to the user.

31 Claims, 3 Drawing Sheets

(56) References Cited

U.S. PATENT DOCUMENTS

| | | | | |
|---|---|---|---|---|
| 2001/0034707 | A1* | 10/2001 | Sakaguchi | 705/44 |
| 2003/0028484 | A1* | 2/2003 | Boylan et al. | 705/40 |
| 2007/0276764 | A1* | 11/2007 | Mann et al. | 705/65 |
| 2009/0037275 | A1* | 2/2009 | Pollio | 705/14 |
| 2009/0210308 | A1* | 8/2009 | Toomer et al. | 705/16 |
| 2009/0216638 | A1* | 8/2009 | Matthews et al. | 705/14 |
| 2010/0121725 | A1* | 5/2010 | Adams et al. | 705/17 |
| 2010/0198728 | A1* | 8/2010 | Aabye et al. | 705/44 |
| 2012/0101875 | A1* | 4/2012 | Nicolaidis et al. | 705/14.1 |
| 2012/0197794 | A1* | 8/2012 | Grigg et al. | 705/41 |

OTHER PUBLICATIONS

Citibank (South Dakota), "Rewards Just Got Even More Rewarding", webpage printed on Feb. 4, 2011 at http://creditcards.citicards.com/usc/10/2g/ph1/default.htm?BT_TX=1&ProspectID=ED52B45 . . . , (2011), (1 page).

Business Wire, "Dynamics' Card 2.0® Technology—Best of Innovations Winner at 2011 CES—To Power New Citi ThankYou(sm) Prestige 2G Card", webpage printed Jan. 10, 2011 at http://www.businesswire.com/news/home/201106005823/en/Dynamics%E2%80%99-C . . . , (Jan. 6, 2011), (3 pages).

Dynamics Inc., "Enabling Payments 2.0®—Welcome", webpage printed on Feb. 4, 2011 at http://www.poweredcards.com/, (2011), (3 pages).

Dynamics Inc., "Enabling Payments 2.0®—Products", webpage printed on Feb. 4, 2011 at http://www.poweredcards.com/products1.php, (2011),(2 pages).

Dynamics Inc., "Enabling Payments 2.0®—Technology", webpage printed on Feb. 4, 2011 at http://www.poweredcards.com/technology1.php, (2011) (3 pages).

Dynamics, Inc., "Enabling Payments 2.0®—Technology/Card 2.0™", webpage printed on Feb. 4, 2011 at http://www.poweredcards.com/card20.php, (2011), (3 pages).

Dynamics Inc., "Enabling Payments 2.0®—Technology Electronic Stripe™ Technology", webpage printed on Feb. 4, 2011 at http://www.poweredcards.com/elec-strip.php, (2011) (2 pages).

Wikipedia, The Free Encyclopedia, "QR Code" webpage printed on Feb. 25, 2011 at http://en.wikipedia.org/wiki/QR_codes, (7 pages).

Apple Insider, "Apple Finalizing Wireless e-Wallet for iPhone 5, iPad 2—report", webpage printed on Feb. 25, 2011 at http://appleinser.com/articles/11/01/25/apple_finalizing_wireless_e_wallet_for_iph . . . , (Jan. 25, 2011) (3 pages).

Apple Insider, "Apple Seesk RFID, Payment Platform Experts, Fueling iPhone e-Wallet rumors", webpage printed on Feb. 25, 2011 at http://appleinsider.com/articles/11/01/26/apple_seeks_rfid_payment_platform_exper . . . , (Jan. 25, 2011) (3 pages).

Cardflash, "Dailey Payment Card News", Cardweb.com, Naples, FL USA, (Sep. 14, 2010).

* cited by examiner

SYSTEM AND METHOD FOR ACCESSING MULTIPLE ACCOUNTS

FIELD OF THE INVENTION

The present invention relates generally to an account access system, and more specifically to an account access system and method that allows an account holder to access and manage multiple accounts using an access device.

BACKGROUND

Financial institutions have offered many different types of credit cards, debit cards, stored value cards and other types of cards providing access to various accounts. Other types of commercial entities also offer different cards and accounts, such as frequent flyer cards, rewards cards for preferred customers, grocery store discount cards, rental car preferred customer cards, and gasoline charge cards. To take advantage of all of these accounts and programs, it may be necessary for an individual to carry many different cards, which can be a nuisance. Consequently, some account holders may leave some or most of the cards at home (for example, a gold card from a rental car company that is used infrequently, or a grocery store discount card). This can lead to further inconvenience if the cardholder unexpectedly needs to use the card while away from home.

In response to these issues, some financial institutions have offered multi-account cards that allow a user to select a particular account on the card to be used in a transaction. Such multi-account cards, however, have not offered a combination of features that makes them particularly desirable or convenient to the consumer. Accordingly, there is a need for an access device, such as in the general form of a credit card, providing features that make it easy for a user to access and manage multiple accounts.

SUMMARY

The invention relates to a system and method for accessing multiple accounts. According to one embodiment, the system includes an access device comprising a body in the form of a card; a processor housed in the body; a memory housed in the body and connected to the processor, wherein the memory stores information on the multiple accounts; a selection device housed in the body and adapted to allow a user to select one of the multiple accounts; a display housed in the body for displaying information identifying the selected account, wherein the processor is programmed to generate a signal to generate the information identifying the selected account in response to a user selecting one of the multiple accounts using the selection device; and a wireless transmitter and a wireless receiver housed in the body and connected to the processor. The system may also include a server that communicates with the access device and with the user, wherein the server communicates with a second wireless transmitter and second wireless receiver that communicate wirelessly with the access device, and the server is adapted to send and receive electronic signals over network to the user.

According to another embodiment, the invention relates to a method for configuring an access device, wherein the access device stores account information on a plurality of accounts held by a user and has a body in the form of a card. According to one embodiment, the method comprises the steps of receiving information from the user relating to at least one of the plurality of accounts held by the user; generating instructions to be sent to the access device, wherein the instructions relate to the information received from the user, and the instructions are adapted to be used by the access device to modify or supplement the account information stored on the access device; and sending the instructions to the access device.

The invention also relates to a computer server that is used to service the access device. According to one embodiment, the server comprises a memory that stores account information on a plurality of accounts held by a user; and a processor that is programmed to receive information from the user relating to at least one of the plurality of accounts held by the user, generate instructions to be sent to an access device, wherein the access device stores account information on the plurality of accounts, the instructions relate to the information received from the user, and the instructions are adapted to be used by the access device to modify or supplement the account information stored on the access device, and send the instructions to the access device.

BRIEF DESCRIPTION OF THE DRAWINGS

In order to facilitate a fuller understanding of the present invention, reference is now made to the attached drawings. These drawings should not be construed as limiting the present invention, but are intended only to be examples of embodiments of the invention.

DETAILED DESCRIPTION OF EXEMPLARY EMBODIMENTS OF THE INVENTION

Figure 1:
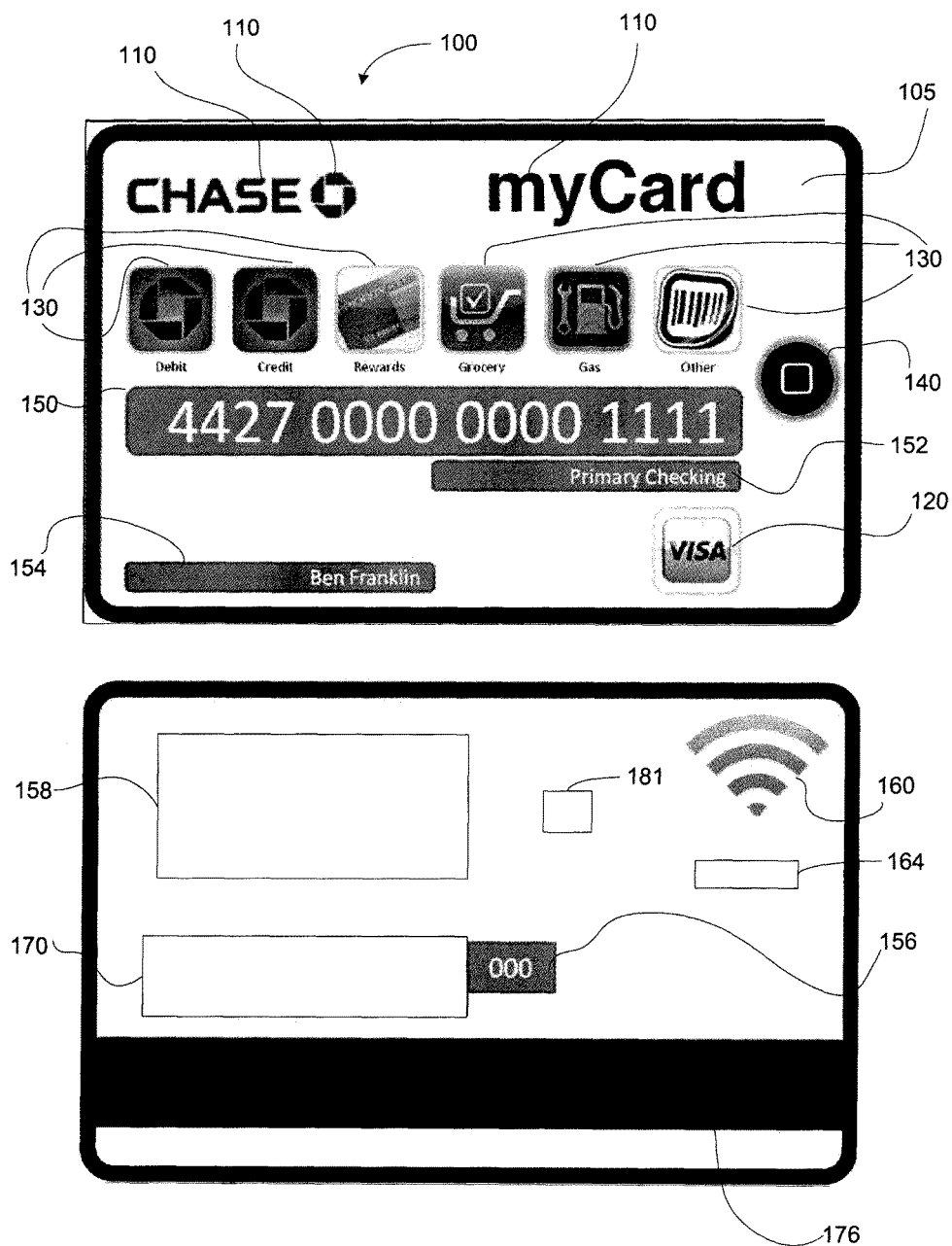
FIG. 1 is a drawing of the front and back side of an example of an access device according to one embodiment of the invention.

FIG. 1 shows an access device 100 for accessing multiple accounts according to one embodiment of the invention. The access device 100 comprises a body 105 that has the general size and shape of a credit card, according to the example shown in FIG. 1. Those skilled in the art will appreciate, however, that the body 105 can have a different size and shape depending on the desired application. The access device 100 may include one or more logos, brands, or product names 110 displayed on the body of the access device 100 identifying the issuing financial institution and the type of access device. The access device may also include one or more logos or brands 120 identifying a payment network.

FIG. 1 also depicts a number of selection buttons 130 on the face of the access device 100. The selection buttons 130 shown in FIG. 1 are housed in the body 105 of the access device 100. The selection buttons 130 allow a user to select a desired account to be activated on the access device 100. The selection buttons 130 can also be used by the account holder to enter a security code to activate and permit use of the access device 100. The access device 100 also includes an on/off power switch 140 that turns the power supply, e.g., a battery, on and off.

The access device 100 shown in FIG. 1 includes one or more displays for displaying information about an account selected by the account holder with one of the selection buttons 130. More specifically, the access device may include a display 150 for displaying an account number, a display 152 for displaying an account name, and a display 154 for displaying the name of the account holder. The back side of the access device 100 may also include a display 156 for displaying a CVV code or other security code and a display 158 for displaying a dynamically generated, machine-readable pattern, such as a bar code, for identifying the selected account. These displays can display the relevant account information in response to the account holder selecting a particular account using the selection buttons 130. The display 158 can also be used to display a picture of the account holder, e.g., for identity verification purposes. Other displays may be included, such as for displaying the logos 110 or the payment network 120.

FIG. 1 also shows that the back side of the access device 100 may include one or more wireless transmitters and receivers 160, a communication port 164, a signature box 170, a magnetic strip 176, which may be a programmable magnetic strip, and contacts 181 for a chip card reader. The wireless transmitter and receiver 160 may comprise a radiofrequency identification (RFID), near field communication (NFC), Bluetooth, and/or WiFi system, for example.

Figure 2:
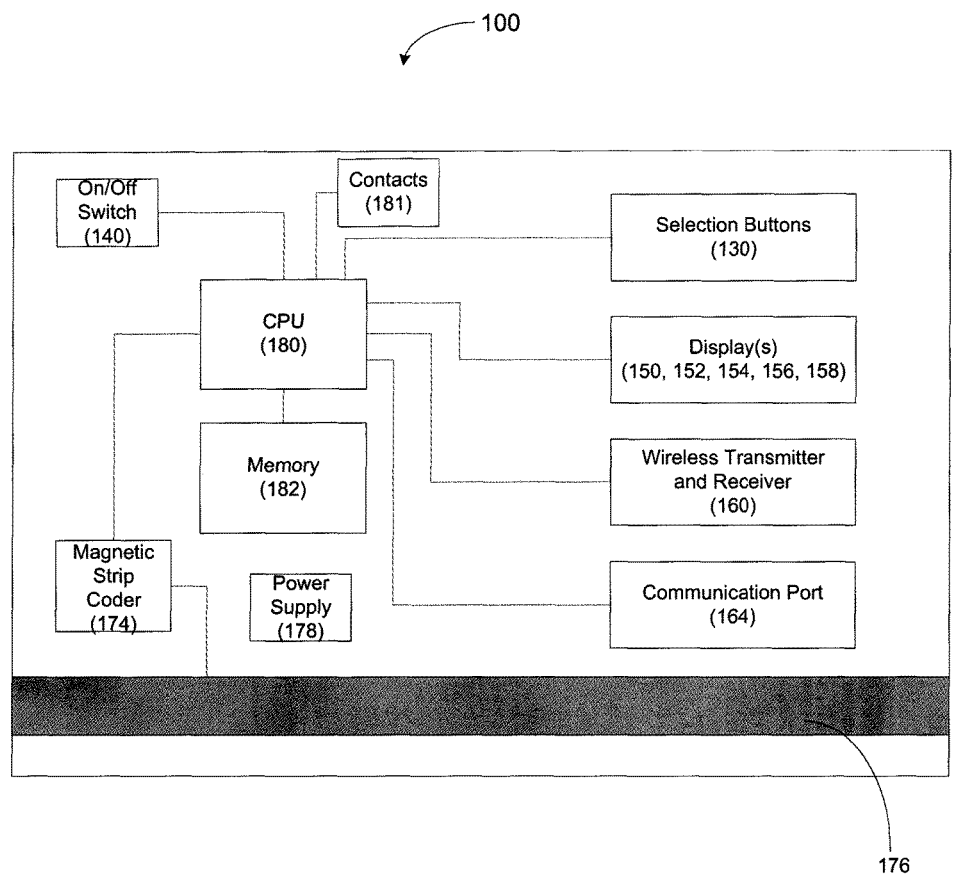
FIG. 2 is a block diagram illustrating an example of hardware components that may be included in an access device for multiple accounts, according to an embodiment of the invention.

FIG. 2 is a block diagram showing an example of hardware components that may be used in the access device 100. As shown in FIG. 2, the access device 100, according to one embodiment of the invention, includes a computer processor 180, electrical contacts 181 connected to the processor, a memory 182, a magnetic strip coder 174, a programmable magnetic strip 176, a power supply 178, and an on/off power switch 140. FIG. 2 also shows the one or more displays 150, 152, 154, 156, 158, the selection devices 130, the wireless transmitter and receiver 160, and the communications port 164. The power supply 178, which may comprise a replaceable or rechargeable battery, supplies power to the power consuming components of the access device 100.

Referring again to FIG. 1, an account holder may initially power up the access device 100 by depressing the on/off power switch 140, which may comprise a toggle switch. In response, the processor 180 begins execution of a program that controls operation of the access device 100. The memory 182 may comprise one or more types of memory components, such as volatile and/or non-volatile memory devices. The memory 182 stores the computer programs (e.g., software) that are executed by the processor 180 to provide the functions of the access device 100 described herein. For example, the memory 182 stores programs that provide communications with the selection devices 130, send instructions to the displays 150, 152, 154, and 156, send and receive data from the wireless transmitter and receiver 160, and send instructions to the magnetic strip coder 174, among other things. The memory 182 also stores data on the various accounts loaded in the access device 100. For example, for a particular credit card account, the memory 182 may store the account number, account name, name of the account holder, CVV code, and credit limit. According to one embodiment, the memory 182 comprises a computer readable medium containing program code instructions executed by the processor 180 to carry out the methods described herein.

After the access device 100 has been powered on, the account holder may also enter a password or other type of security code in order to be able to use the access device 100, according to one embodiment of the invention. The processor 180 may be programmed to require this step in order to prevent unauthorized use of the card, in the event that the card is lost or stolen. The processor may also be programmed to initially display a message such as "Please enter your security code" on one of the displays e.g., display 150. According to one embodiment of the invention, the selection buttons 130 can be used by the account holder to enter the security code. For example, the security code can be defined as a predefined sequence of depressions of the selection buttons 130, such as Grocery, Grocery, Debit, Rewards, Other, Rewards, Credit, for example. The processor 180 may be programmed to require entry of the security code after the access device 100 is turned on. The processor may also be programmed to disable the access device 100 after a specified period of time, e.g., ten minutes, thus requiring the user to re-enter the security code to regain access. Initially, the user may receive the security code from the entity that issues or services the access device 100. The user may then have the opportunity to change the security code. Alternatively, the user may initially select his or her security code prior to the access device 100 being loaded with the account information.

Other types of security procedures can be incorporated into the access device 100, as will be appreciated by those skilled in the art. For example, the access device 100 may include a biometric sensor and associated processing routine executed by the processor 180 to analyze biometric data and determine whether it matches the account holder. Also, the access device 100 may be configured so some or all of its functions work only when the account holder's mobile phone is in proximity and detected by the access device 100. Also, the security code may be entered by the account holder as a sequence of timed depressions of a single selection button 130, such as in a Morse code message. These security procedures can all reduce the likelihood that an unauthorized user will able to access the account information on the access device 100.

After the access device 100 has been turned on and the security code has been entered correctly, or the access device 100 has otherwise verified the identity of the user, the account holder then has the ability to activate one of the accounts stored on the access device 100. The selection buttons 130 can organize the accounts into different categories, such as credit accounts, debit accounts, rewards accounts, grocery programs, gas programs, gift card, and other programs. As used herein, the term "account" may be used to refer to any of the aforementioned accounts or programs. The account holder can toggle through each category by repeatedly pressing a particular selection button 130. For example, the user may have a Bank 1 Airline 1 Visa credit card, a Bank 1 Airline 2 Visa credit card, and a Bank 1 cash rewards credit card stored on the access device 100. By depressing the "Credit" selection button 130 repeatedly, these three accounts are displayed sequentially.

Each account may be displayed using one or more of the displays 150, 152, 154, 156, 158. For example, if the account holder selects the Bank 1 Airline 2 Visa credit card, the display 150 may display the account number, the display 152 may display the account name, such as "Bank 1 Airline 2 Visa credit card," the display 154 may display the account holder's name, and the display 156 may display the cardholder verification value (CVV). If desired, additional displays can also be provided to display additional information, such as logos of the financial institution, the type of card, and the payment network (120). These additional displays can be variable displays so that they can be changed by the user selecting a particular account. In general the variable displays described herein, including 120, 150, 152, 154, 156, and 158 can comprise liquid crystal, thin film transistor, thin film diode, organic light emitting diode, capacitive touchscreen, or resistive touchscreen displays, for example.

According to one embodiment, most or substantially all of the face of the front or back of the access device 100 can comprise a single display that is programmed to display some or all of the information described herein, such as the account number, account name, name of the account holder, selection buttons, logos for financial institution, type of card and payment network, CVV, and bar code. In such case, the single display may comprise a capacitive or resistive touchscreen allowing the user to provide input and interact with the access device by touching the screen. The touchscreen would thus function as the selection buttons 130, among other functions. The amount of area devoted to the display for the front and/or back of the access device 100 can be designed according to the desired application or environment.

The selected account may also be identified with the programmable magnetic strip 176, the display 158, the electrical contacts 181, and/or the wireless transmitter 160. These features allow the access device 100 to communicate and interact with various existing communications systems, including point of sale (POS) devices that read magnetic strips, bar code or other optical scanners, chip card readers, and radio frequency identification (RFID) readers. The wireless transmitter 160 may comprise a radiofrequency identification (RFID), near field communication (NFC), Bluetooth, and/or WiFi system, for example. According to one example, the processor 180 can be programmed to instruct the magnetic strip coder 174 to generate a magnetic code to be encoded onto the magnetic strip 176 which includes information programmed onto a magnetic strip in a conventional credit card, such as the account number, CVV, and expiration date. The information programmed onto the magnetic strip can also include other desired information, depending on the type of account being used. The magnetic strip coder 174 can be instructed by the processor 180 to erase the magnetic strip 176 after a predetermined time period, e.g., five minutes, to enhance the security of the access device 100. The CVV can be a dynamic CVV, for example, that changes over time to enhance security. The electrical contacts 181 can be used to communicate with a chip card reader to send and receive information to and from the chip card reader.

The display 158, according to one embodiment of the invention, displays a machine-readable pattern or code, such as a 1D, 2D, 3D or QR bar code, or other machine-readable pattern. This functionality allows the account information to be scanned optically with a bar code scanner or other optical device. The display 158 may encode the account number, CVV and expiration date, for example, or other desired information depending on the type of account. This feature allows the access device 100 to interact with existing optical scanners so that it can be used, for example, in place of a conventional rewards card with a bar code that is scanned by a cashier.

According to another embodiment of the invention, the processor 180 can instruct the wireless transmitter 160 to transmit an RFID signal that includes desired information on the account or program, such as an account number, CVV, and/or expiration date, or other information. This information is received wirelessly by an RFID system or other wireless reader device. The information transmitted wirelessly may include any desired information that is relevant to the account being used. This feature allows the access device 100 to interact with existing RFID or other wireless communication devices.

After a particular account has been activated, and the access device is displaying or communicating the relevant account information (e.g., through a visible display, the programmable magnetic strip, electrical contacts, or the RFID feature), the relevant component of the access device can be used to initiate a transaction on the selected account. For example, when the programmable magnetic strip has been encoded, the access device can be swiped through a point of sale reader like a conventional credit card. Or, when the display 158 is displaying a bar code, it can scanned with an optical scanner to initiate a transaction on a grocery store preferred customer account, such as a discount on certain food items being purchased. Or, when the wireless transmitter transmits an RFID signal, that signal can be used to initiate a purchase transaction at a gas station. Or, the contacts 181 can be used to communicate with a chip card reader to initiate a transaction.

As with the selection button 130 for credit accounts, the other selection buttons 130 can be used to toggle between accounts in the other categories. For example, the user may have a checking account with a debit card and a savings account with a different debit card. By sequentially depressing the "Debit" selection button 130, the user can activate and display these two debit accounts using one or more of the displays 150, 152, 154, 156, 158, the magnetic strip 176, and/or the wireless transmitter 160.

The user may have a number of rewards accounts, such as a Hotel 1 rewards account, Airline 1 rewards account, and Bookstore 1 rewards account. The user can depress the "Rewards" selection button 130 to sequentially activate these rewards accounts and display them using one or more of the displays 150, 152, 154, 156, 158, the magnetic strip 176, and/or the wireless transmitter 160. The account holder may then be able to make a purchase using rewards points or a combination of rewards points and another payment source. Or, the identification of the rewards account may allow the user to obtain or earn some other benefit, such as an upgrade, points, miles or discount.

The user may have a number of grocery store discount cards. For example, the user may shop at Grocery Store 1, Grocery Store 2, and Grocery Store 3, each with its own discount program card. The user can sequentially activate each account by pressing the "Grocery" selection button 130. As one example, the user can press the Grocery selection button 130 twice to active the Grocery Store 2 discount program. The processor responds by displaying the account number on display 150, "Grocery Store 2 Discount Program" on display 152, the user's name on display 154, and a bar code on display 158. The user then hands the access device 100 to the grocery cashier, who scans it with the optical scanner. The same or a similar process can be used for gas station rewards programs or discount programs.

The "Other" selection button 130 is provided for use with other types of accounts or programs. For example, one or more stored value accounts may be stored under the "Other" category. The user can then activate a desired stored value account by sequentially pressing the "Other" selection button 130 until the desired stored value account is displayed. The display of the stored value account may include displaying the account number with display 150, displaying the account name with display 152, displaying the name of the account holder with display 154, and displaying the amount of stored value with display 158.

In addition, passwords may be stored under the "Other" category. For example, the user may store passwords for various accounts and load them onto the access device 100. By sequentially pressing the "Other" selection button 130, the access device 100 may display the password on display 150 and a description of the associated account on display 152.

As is evident from the foregoing description, the access device 100 can be customized by the user as to each account and as to which accounts are loaded onto the access device 100. The access device 100 includes displays 150, 152, 154, 156, and 158, programmable magnetic strip 176, contacts, 181, and wireless transmitter and receiver 160. The user can specify which of these output components are used to show, display, and identify the selected account. For some types of accounts, such as credit card accounts, the user may choose to use displays 150, 152, 154, 156, magnetic strip 176, and/or contacts 181. For other types of accounts, such as grocery store discount programs, the user may choose to use displays 152, 154, and 158. For other types of accounts, such as gas station charge cards, the user may choose to use the displays 150, 152 and 154 and the wireless transmitter 160. The wireless transmitter 160 then transmits an RFID signal to a gasoline pump to access the gas station account, for example.

Those skilled in the art will appreciate that these features and hardware components of the access device 100 allow it to communicate with existing infrastructure. For example, the magnetic strip allows the access device 100 to work with various existing point of sale (POS) terminals; the dynamic bar code generation with display 158 allows the access device 100 to interface with existing optical scanners, such as those utilized by grocery stores, to scan the bar codes of their discount cards; the electrical contacts 181 allow the access device 100 to interface with existing chip card readers, and the wireless transmitter and receiver 160 allow the access device to interface with existing RFID systems, such as those used at certain gas stations, to interface with the customer's corresponding RFID device. The size and shape of the access device 100 can be in the general form of a credit or debit card. For example, according to one embodiment, the access device 100 can have a length of 83-89 millimeters (mm), preferably about 85.66 mm; a width of 51-57 mm, preferably about 53.98 mm; a thickness of 0.5-1.0 mm, preferably about 0.76 mm, and rounded corners with a radius of 3.0-3.4 mm, preferably about 3.18 mm. Those skilled in the art will appreciate that the access device 100 may have another size and shape depending on the desired application.

The processor 180 can be programmed to store in the memory 182 any desired types of information for the various accounts stored on the access device 100. For example, with credit card accounts, the information stored in the memory 182 may include the account number, CVV, expiration date, credit limit, other spending limit, issuing bank, transaction network, account name, name of account holder, and image of account holder. For debit accounts, the stored information may include the account number, balance, accessible balance, issuing bank, transaction network, name of the account, account holder name, and image of account holder. For rewards programs, the stored information may include the commercial entity providing the rewards, the account number, the account name, the name of the account holder, and the points balance. For grocery store accounts, the stored information may include the name of the grocery store, account number, account name, and name of the account holder. For gas station accounts, the stored information may include the issuing gas station, account number, CVV, account name, and name of the account holder. For stored value accounts, the stored information may include the name of the issuing commercial entity, account number, CVV, account name, name of the account holder, and balance. For passwords, the stored information may include the account name and the password. Some or all of this information may be displayed on the various displays described herein, and/or stored, in the form of numeric, alphanumeric, 2D and/or QR barcode information, for example.

Figure 3:
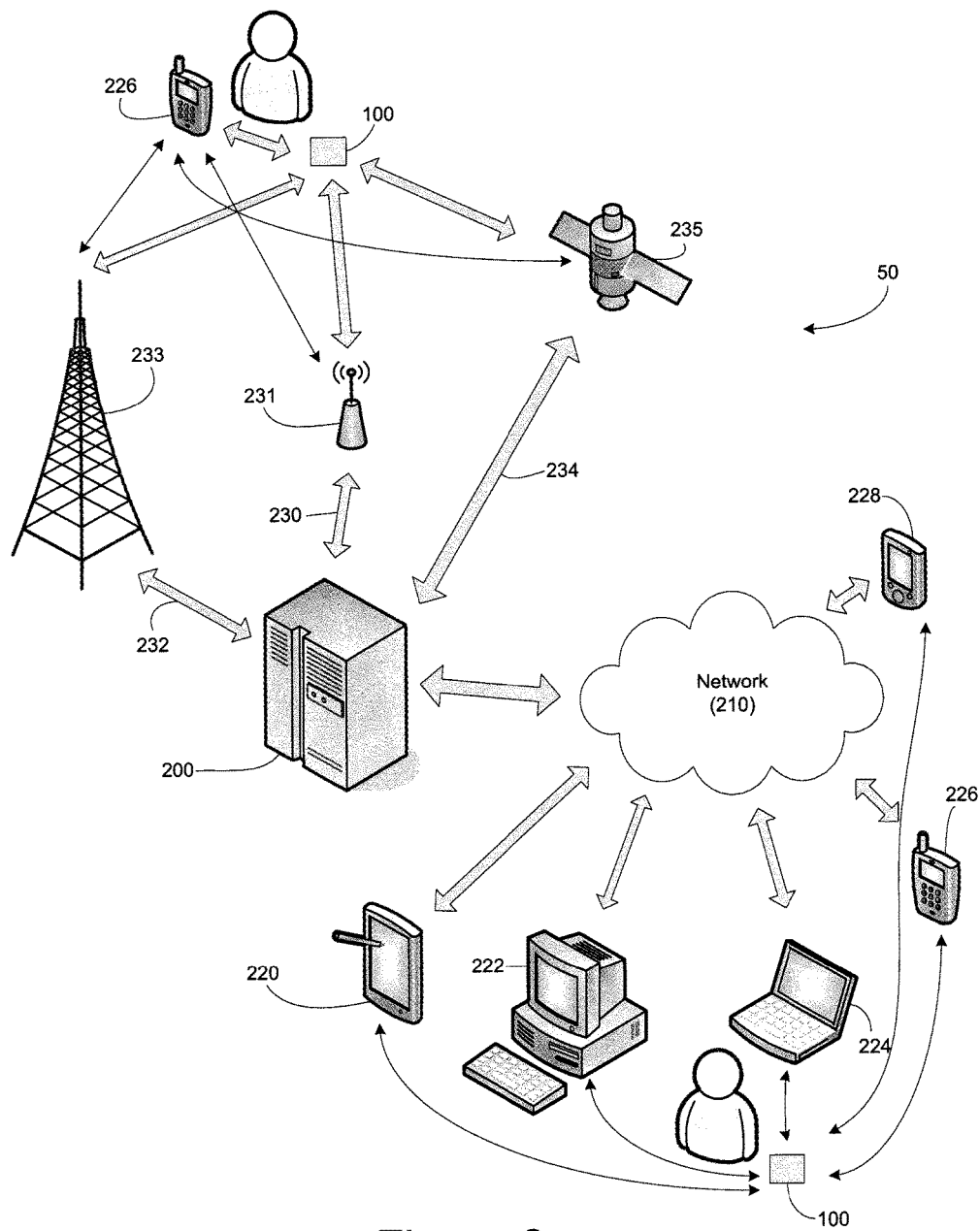
FIG. 3 is a diagram of an example of a system for allowing a user to manage multiple accounts stored on an access device according to an embodiment of the invention.

One advantageous feature of various embodiments of the account access system described herein, is that the account holder can configure and manage the access device 100 easily through a user interface provided through a website. The access device 100 can be part of an access system 50, which is shown in FIG. 3. The access system 50 includes a server 200 that can communicate with the access device 100 through various communication channels. The server 200 can also communicate with the user's computer, smart phone or other communications device via a network 210 such as the Internet. The server 200 may comprise one or more computer processors, one or more memory or storage devices for storing data and computer programs, and associated hardware for communications over a network. The server 200 includes software or computer programs stored on the memory (computer readable medium containing program code instructions executed by the processor) for executing the methods described herein. The memory associated with the server 200 may comprise, for example, a hard disc, optical disk, a magnetic tape, RAM, a ROM, a PROM, and/or a EPROM, for example. The memory or memories used in the server 200 that implements the invention may be in any of a wide variety of forms to allow the memory to hold instructions, software, data, or other information, as desired.

According to one embodiment of the invention, the server 200 is operated and maintained by a financial institution, commercial entity, or other service provider. The service provider may offer and issue the access device 100 and/or may also provide related services. The services may include, for example, hosting a website on the server 200 to allow the user to configure, manage and locate the access device 100 and the accounts stored on it, and providing communication services between the server 200 and the access device 100 through one or more communication channels 230, 232, 234. The service provider may communicate with the user of the access device 100 through a website and user interface provided by the server 200. The service provider may also communicate with the user through other channels, such as telephone, regular mail, short message service (SMS), social media channels, and the like. For example, the service provider may provide a designated phone number for providing services through a voice response unit (VRU) and/or a customer service representative (CSR). The user can then call the designated phone number to set up or reconfigure the access device 100 by providing relevant information on the various accounts stored on the access device 100. To assist the user, the service provider may ask questions in any suitable format (e.g., dropdown menu on a website, VRU questions, CSR questions, etc.) relating to configuration of the access device 100 and the accounts to be stored on it.

According to one embodiment, the service provider may be a bank that issues credit cards and debit cards. In this case, the service provider may provide the aforementioned services with respect to accounts that it has issued and also with respect to accounts issued by other banks or businesses. According to another embodiment, the service provider may be a commercial entity that is not a bank and does not issue any of the accounts or programs loaded onto the access device 100.

As shown in FIG. 3, the user may access the server 200 via the network 210 using a tablet computer 220 (e.g., an Apple iPad), desktop computer 222, laptop computer 224, smart phone 226, e-reader 228 (e.g., an Amazon Kindle e-reader), or other computing device. In order to access the server 200 to manage and configure the accounts on the access device 100, the user enters a password and username. The server 200 may communicate with the wireless transmitter and receiver 160 of the access device 100 through a first communication channel 230 that includes a local wireless transmitter and receiver 231 (e.g., an access point, also sometimes referred to as a "hot spot"). This communication channel 230 may utilize a Wi-Fi network, such as a wireless local area network (WLAN) based on the IEEE 802.11 standard. The Wi-Fi network may provide a Wi-Fi Positioning System (WPS) capability, which can be used to determine the location of the access device 100, update the profile of the access device 100 any time the access device 100 is connected to the Wi-Fi network, and generate a new CVV whenever the access device 100 connects to a new hotspot, for example.

As shown in FIG. 3, the server 200 may also communicate with the wireless transmitter and receiver 160 of the access device 100 through a second communication channel 232 that includes a base station 233, and a third communication channel 234 that includes a satellite 235. These communication channels are examples only, and those skilled in the art will appreciate that other communication channels may be used by the server 200 to communicate with the access device 100.

FIG. 3 also shows that, according to some embodiments, the server 200 may communicate with the access device via the mobile phone 226, through the base station 233, hotspot 231, or satellite 235. FIG. 3 also shows that, according to some embodiments, the server 200 may communicate with the access device through the network 210 and one or more of the tablet computer 220, desktop computer 222, laptop computer 224, mobile phone 226, and e-reader 228.

According to one example, the user can configure the access device 100 by using their laptop computer 224 to visit a website hosted by a service provider (e.g., a bank) with its server 200. The service provider makes the website accessible to the user, e.g., through the Internet. The website includes web pages that include a user interface. The user visits the website, such as by typing in a http address, and the server 200 sends web a page, e.g., in HTML or XML markup language, to the user's laptop computer 224. The user interface is displayed on the screen of the user's laptop computer 224. The user interface may include a number of dropdown menus or other input mechanisms, such as input text boxes or login screens or boxes, to allow a user to input data relating to the accounts he or she would like to add to the access device 100. Through the user interface, the user can input all the pertinent data relating to each account, including access information and limits on use, as well as information regarding how the account information is displayed, exhibited or transmitted by the various hardware components of the access device 100 when selected using the selection buttons 130. The user thus has the ability to associate any desired accounts or programs with the access device 100 and to customize the way each account or program is displayed, identified and/or transmitted by the access device 100, and used by the owner of the access device, once the user selects that particular account or program. In this way, the access device 100 may be transformed by the user into his or her preferred configuration.

As one example, the user interface sent by the server 200 and displayed on the user's computing device 220, 222, 224, 226, 228 may include a dropdown menu to enable the user to select the type of account (e.g., Credit, Debit, Rewards, Grocery, Gas, Other). The user may select the Credit type of account, for example. The user interface may include additional dropdown menus or other input mechanisms specific to the account type specified by the user. For example, the user interface may have a box or dropdown menu that allows the user to specify the payment network (e.g., VISA, MasterCard, etc.) for an account, the account number, CVV, account name, name of the account holder, and expiration date. This data can be encrypted before being transmitted between the user's computing device 220, 222, 224, 226, 228 and the server 200.

The user interface can also be designed to allow the user to specify the manner in which account information is displayed, exhibited or transmitted once the user selects the particular account with the selection button 130. For example, the user can specify with the user interface that when the Bank 1 cash rewards credit account is selected, the account number will be displayed by display 150, the account name will displayed by display 152, the account holder's name will be displayed by display 154, the CVV will displayed by display 156, and the magnetic strip will be programmed to store the account number, CVV, and expiration date. For each account stored on the access device 100, the user can specify which displays, if any, will be used, what they will display, whether and how the magnetic strip 176 will be programmed, and whether the wireless transmitter 160 will transmit any account information. As another example, the user may specify with the user interface that a grocery store discount card will display an account number in display 150, an account name in display 152, and a 2D bar code in display 158. Or, the user may use the user interface to specify that when the "Other" selection button 130 is depressed to select the user's retirement account password, the account name will be displayed in display 152 and the password will be displayed in display 150. The user can generate a bar code, for example, by entering a loyalty card number or a UPC number which allows the access device 100 to generate the machine-readable bar code, or by scanning an image of a card having the human and machine-readable values and sending that scanned image to the server 200, or by taking a picture of the card and sending that picture to the server 200, which then processes the image to extract the human and machine-readable bar code information.

According to one embodiment, the user can specify account restrictions for one or more of the accounts stored on the access device 100. For example, the user may configure one of the accounts so that the account information is displayed and/or the magnetic strip is programmed and/or the bar code is displayed only during restricted hours. Or, the user may configure an account such that a password or security code is required before the access device 100 will display or transmit the account information/magnetic strip/bar code. Or, the user may configure an account so as to require a registered mobile near field communication (NFC) device to have an open communication channel with the access device 100 if the user attempts to display or transmit the account information/magnetic strip/bar code. Or the user may configure an account to have a spending limit during a specified time period (e.g., $300 per month for the Bank 1 credit card, or $150 per month for the Bank 2 debit card). In this case, the user may override a self-imposed spending limit by entering a code into the access device 100 or through the server 200, and the access device 100 may also display a warning light or signal if the user attempts to exceed the self imposed spending limit. The access device 100 can also be designed such that it is disabled after a certain period of time, e.g., 10 minutes, thus requiring the user to enter or re-enter a security code to gain access to the access device 100.

After the user has entered all the data pertinent to a particular account, including the specifications as to what information will be displayed and how it will be displayed or transmitted, and any restrictions on use of the account, the user can click a button on the user interface to signify that the account information is complete and can be stored on the server 200. The user can then repeat the process for each additional account or program that the user wishes to store on the server 200 and the access device 100. As one example, for the purposes of illustration, the user may wish to store on the server 200 and on the access device 100 two credit accounts, two debit accounts, three frequent flyer rewards accounts, a rental car preferred customer account, two grocery store discount programs, a gas charge card, and five passwords.

The user interface provided by the server 200 may also include a button to allow the user to signify that all the account information is complete and to instruct the server 200 to transmit the account information to the access device 100. The server 200 can then transmit the data to the access device 100 through a specified communication channel Initially, the user may wish to have the server 200 send the account information through the network 210 to the user's personal computing device 220, 222, 224, 226 or 228, for example. The user can then link his or her personal computing device 220, 222, 224, 226 or 228 to the access device 100 to load the account information transmitted by the server 200 onto the access device 100. This link can be a wireless link, such as a Bluetooth connection, or it can be a wired link from the personal computing device 220, 222, 224, 226 or 228 to the physical communications port 164 on the access device 100. The user may also wish to have the server 200 transmit the account information through one of the other communication channels 230, 232, or 234. After the data has been loaded onto the access device 100, the user can use the selection buttons 130 select and activate any of the accounts stored on the access device 100. This process provides the technical effect that the access device 100 is configured as a single device that displays, exhibits, and transmits the user's accounts and programs according to the user's preferences.

Over time, the user may wish to update the accounts and/or account information stored on the access device 100. The user can use the user interface provided by the server 200 at any time to make such updates. For example, the user may add a new credit card account and delete a frequent flyer account. Or, the user may update account information, such as the expiration date, on an account stored on the access device 100. The user may also update the specifications for how the account information is displayed or transmitted after being selected by the user with the selection buttons 130.

According to another aspect of the invention, the account access system 50 can allow an account holder to remotely reconfigure the account information on a specified access device 100. According to one example, a primary account holder who is a parent may have an account where a son or daughter is issued a card under the account. The parent may wish to temporarily provide a specified amount of funding to the daughter. For example, the daughter may need to buy books for college classes. The parent can access the website hosted by the server 200, for example with their laptop 224 or mobile phone 226, and use the user interface in the website to specify that for the selected account, the daughter has a credit limit of a specified amount during a predetermined time period. When the daughter's access device 100 is in range of a communication channel, e.g., the daughter goes to a hot spot 231 at her university, the new account access information is downloaded to the access device 100. The daughter is then able to use the access device 100 to make purchases up to the specified credit limit during the specified time period. The parent can also use the user interface and his or her mobile phone 226 or laptop 224 to terminate the daughter's access to the account. According to another example, the parent may, using his or her mobile phone, laptop or home computer, transfer funds from his or her checking account to a stored value account on the daughter's access device 100. According to another example, the parent may, using his or her mobile phone, laptop or home computer, activate or deactivate the daughter's ability to use the access device 100 to withdraw cash from an automated teller machine (ATM), and may also specify a limit on the amount of cash that the daughter may withdraw. The user interface provided by the server 200, which is accessible by the parent, for example, through his or her mobile phone, provides great flexibility in allowing the parent to manage and control the access to various accounts stored on the daughter's access device 100.

The ability to remotely configure an access device 100 can also be used to replace a lost or stolen access device 100. The user can first use the user interface, or a specified phone number provided by the service provider, to deactivate the lost or stolen access device 100 so that it can no longer be used. The access device 100 can then be wiped clean (i.e., all stored data erased) or deactivated by the server 200 the next time it is connected to the Wi-Fi network. The user then obtains a new, blank access device 100, such as by purchasing a generic access device 100 from a retailer, or at a kiosk, or obtaining an access device 100 from another source. The user can then request the server 200 to transmit the account information wirelessly to the new, blank access device 100, e.g., via a hot spot connection 230. Because the user starts out with a generic access device 100, this process can be carried out much faster than a typical replacement process where the replacement card must be custom manufactured for a particular account holder. This process may include a security step of sending a new security code to the user's mobile phone or email address, to be entered into the access device 100, for activation of the access device 100.

According to another embodiment of the invention, the user can create one or more profiles for the access device 100. Each profile defines a desired combination of accounts that may be appropriate or useful to the user in certain circumstances. For example, the user may create a "business travel" profile. The business travel profile would be defined by the set of accounts that the user would typically access on a business trip. Typically this set of accounts would be a subset of all of the user's accounts. The business travel profile might include, for example, the user's corporate card account, car rental company preferred customer account, hotel chain preferred customer account, and airline frequent flyer account. The user can create the profile on his or her tablet computer 220, desktop computer 222, laptop 224, mobile phone 226, or e-reader 228 for example, by using a graphical user interface to identify the group of accounts that would be associated with the profile. The user could also name the profile and activate the profile on the access device 100 using the graphical user interface. The other accounts of the user that are not included in the profile would be disabled such that they would not appear on the access device when the profile is activated. In this way, the user can conveniently access his or her relevant accounts for business travel without having to sort through all of his or her accounts. The profile could also include information on how to order the accounts within the profile, such that the most frequently used accounts are displayed first for the user. The information defining the profile can be stored on the user's device 220, 222, 224, 226, 228 and on the server 200, for example.

According to one embodiment, when a profile is activated, the selection buttons 130 can change their appearance to match the profile. For example, if the business travel profile is activated for the access device 100, the selection buttons might change to Debit, Credit, Airline, Car Rental, Hotel and Other. This feature could be achieved by incorporating a dynamic display into, adjacent to, or otherwise associated with the selection buttons. The dynamic display would display the particular category for each selection button relevant to the applicable profile. The processor could also be programmed to display the profile name on display 154. For example, rather than displaying "Ben Franklin," the display 154 could display "Ben Franklin—business travel" when the business travel profile was selected.

As another example of a profile, the user may create a "weekend" profile, which includes one or more of the user's personal credit cards, debit cards, rewards cards, gas station preferred customer cards, gift cards, etc. The user can define the weekend profile using the same method as described above for the business travel profile. The user can also include one or more self imposed limits on access to various accounts as part of a profile. For example, the user might include his or her Bank 1 Credit Card in the profile and specify a self imposed spending limit of $300 per weekend. The accounts and account access limits for a profile can all be defined, and the profile can be activated, using the various input devices 220, 222, 224, 226, 228. The other accounts of the user that are not included in the profile would be disabled such that they would not appear on the access device when the profile is activated. This feature can also provide a certain measure of security, since the user can configure the profile to include only a limited number of accounts. For example, if the user is concerned about security, the user can create a profile that includes, for example, only one credit card having a low spending limit. The access device 100 would then include only that one account. Carrying the access device 100 configured in that manner might be more desirable to a user concerned about security than if the access device 100 was configured to store five different credit card accounts, two debit accounts, a stored value card, and various gift cards.

Another embodiment of a profile is a profile associated with a particular person, such as a family member. For example, the husband and wife might define the "Frank" profile, the "Edith" profile, and the "Frank Jr." profile, each with its own designated set of accounts and optionally account access limits. The creation and activation of these profiles can be accomplished as described above using the devices 220, 222, 224, 226, 228, for example. The profiles can be activated remotely. So, for example, if Edith is shopping, wants to make a large purchase, and Frank wants his Bank 1 Credit Card to be used for the purchase to obtain the benefit of rewards points, Frank can remotely activate the Frank profile on Edith's access device 100 using his mobile phone 226, Edith's access device being wirelessly connected to a hotspot is configured to have Frank's profile, and then Edith makes the purchase using Frank's Bank 1 Credit Card.

According to another embodiment of the invention, the financial institution, commercial entity, or other provider of an account may have limited access to the server 200 and the access device 100 in order to update certain information relevant to the account it provides. For example, a bank issuing a credit card may have the ability to update the expiration date for a credit card account stored on the server 200 and access device 100; a bank issuing a debit card may have the ability to update the account number for the debit card; or a grocery store may have the ability to add a bar code feature to its preferred customer card. The user may agree to allow an account provider to modify certain specified account information stored on the access device 100 and server 200 for a particular account.

In some circumstances, the user may wish to allow wireless connections between their access device 100 and only certain designated hot spots (wireless access points). For example, the user may wish to have the access device 100 interface wirelessly only with hot spots at certain trusted retailers or other trusted organizations. The user may desire to avoid wireless communications with just any hotspot. To enable this selectivity, the user interface provided by the server 200 and displayed on the user's computing device 220, 222, 224, 226, 228 may allow the user to designate only certain hot spots or certain trusted companies or organizations providing hot spots as being authorized by the user for wireless communication with the user's access device 100.

The access device 100 and server 200 may provide other security features according to various embodiments of the invention. For example, the on/off switch 140 or one of the selection buttons 130 may be used to freeze the current account selection for a specified time period, e.g., 8 minutes, after which the access device 100 is turned off. This feature can allow the account holder to give the access device 100 to a waiter at a restaurant without concern that the waiter will be able to access other accounts on the access device 100. According to another embodiment, the server issues a dynamic CVV, so that the CVV changes each time the user enters a new hot spot. This feature can reduce the risk of unauthorized use of an account, since the old CVV number will be invalid once the card is taken to a new hot spot. In addition, when a number of family members share a common account, the server can issue different CVV numbers to each family member so that the server 200 can track use of an account individually for each family member.

According to another aspect of the invention, the access device 100 is programmed to communicate with the user's mobile phone. This connectivity, which may be accomplished with a Bluetooth, near field communication (NFC), or other local wireless connection for example, allows the user to send and receive data from the access device 100 via the user's mobile phone. This feature may be advantageous, for example, in communicating with the access device 100, since it allows the user to use the full keyboard on his or her mobile phone for such communications.

The access device 100 can also be programmed to detect when it is in proximity and in communication with the user's mobile phone. The access device 100 may be configured by the user, using the user interface provided by the server 200, such that some or all of the functions provided by the access device 100 are available only when the access device 100 detects the presence of the user's mobile phone. For example, for enhanced security, the access device 100 may enable access to certain accounts or programs only when it can detect the presence of the user's mobile phone. In one example, the access device 100 would display account information, generate the magnetic strip code, generate the bar code, and/or transmit a wireless signal identifying the selected account only if a registered mobile NFC device (e.g., 226) has an open communication link with the access device 100.

The access device 100 can also be programmed to allow updating of account information stored on it through the user's mobile phone 226, without use of the server 200. According to this embodiment, the user's mobile phone 226 includes a software application allowing the user to enter all the pertinent account data as described herein through the mobile phone interface. The user's mobile phone 226 can also store in its memory all of the desired data described herein that may also be stored on the server 200, or on the user's laptop or other computing device relating to the user's accounts. The user's mobile phone 226 can thus operate as a "logical wallet" for the user, storing all desired data for the accounts accessed with the access device 100, and the access device may be considered to be "tethered" to the user's mobile phone. The mobile phone 226 can therefore send the information and/or commands wirelessly or through a wired connection to the access device 100 without going through the server 200. When the access device 100 or mobile phone 226 thereafter connects to the server 200 through a WiFi or other communication channel, the new account information stored on the access device 100 or mobile device 226 may be transferred to and synchronized with the account information stored on the server 200. In this way, the user can update the account information stored on the access device 100 even when the access device is not in communication with the server 200. The user can also use his or her mobile communications device 226 to send any other information relating to an account held by the user to the access device 100, such as a command to activate a particular account already stored on the access device 100, or a time limit after which the access device 100 will be deactivated.

According to another embodiment of the invention, the user can program the access device 100 to display certain default preferences based on the location of the access device 100 determined with a Wi-Fi Positioning System (WPS). For example, the user can specify, through the user interface provided by the server 200, a particular account to use at a particular merchant. As one example, the user can program the access device 100 to display his or her Bank 1 cash rewards credit card at a particular department store, display his or her stored value card at a particular coffee shop, and display his or her frequent flyer card at a particular airport. These accounts are then displayed for the user at the designated location, determined using the WPS, after the user has entered the security code to activate the access device 100. The default selections can then be overridden by the user using the selection buttons 130 if desired by the user. The user may also specify that the appearance of the access device 100 should change to match the location when the access device 100 is present at the location. For example, the access device 100 may use a number of displays to give the access device 100 the appearance of Retailer 1 and its logo, when the user carries the access device 100 into Retailer 1's store.

The WPS system, in connection with the access device 100, can also be used to provide targeted offers to the account holder based on his or her location. For example, the WPS system may determine the user's location based on wireless communications between the access device 100 and a hot spot, and the server 200, in response, may send a targeted offer to the user in real time. For example, if the hot spot receiver determines that the user is near a particular coffee shop, the server 200 may send an offer to the access device 100 for a free upgrade from a coffee to a café latte if the user uses a specified account on the access device 100 to pay. The server 200 may also generate and send to the access device 100 a coupon, identified by a bar code, that is displayed on display 158. The user can then take advantage of that coupon to obtain a discount at the retailer where he or she is presently located.

According to another aspect of the invention, the access device 100 can be used to expedite access to Internet sites. With this embodiment, the user has stored on the server 200 a number of passwords and/or usernames for various accounts accessible through the Internet. The user then establishes a communication link between the access device 100 and the user's personal computing device 220, 222, 224, 226, or 228. The access device 100 then monitors the websites visited by the user, and provides passwords for those websites that require passwords and where the user has stored those passwords on the access device 100. In this way, the access device 100 expedites the user's ability to visit websites by automatically providing passwords and usernames for the various websites, rather than having the user enter passwords and usernames manually at each site. This functionality can also be provided using a mobile phone 226 instead of the access device 100, where the mobile phone 226 has a communication link with the tablet computer 220, desktop computer 222, laptop computer 224, or e-reader 228.

According other embodiments of the invention, the wireless transmitter and receiver 160 in the access device 100 can be configured to perform additional functions. For example, the wireless transmitter and receiver 160 can be programmed to start an automobile or effect payment to a parking meter, if such equipment has been designed to include compatible wireless communication components. The access device 100 can also be programmed to unlock a door on a house that has compatible wireless technology.

According to other embodiments of the invention, desired functions described herein performed by the access device 100 can be performed by a software application running on a mobile phone. For example, a mobile phone having a keypad, processor, memory, one or more displays, and wireless communication system can perform many of the functions described herein performed by the access device 100, such as displaying an account number, account name, name of account holder, payment network logo, financial institution logo, and/or bar code, or sending a wireless NFC signal identifying an account. A user could then, for example, display the bar code for a particular account for scanning by an optical scanner, or identify an account using the NFC signal.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by the server 200 may be stored and cataloged in a database included as part of the server 200, or located remotely but in communication with the server 200. The database may comprise a searchable database, relational database, query format database, Standard Query Language (SQL) format database, or storage area network (SAN), for example. The database may comprise a single database or a collection of databases, dedicated or otherwise. In some embodiments, the database may comprise a file management system, program or application for storing and maintaining data and information used or generated by the various features and functions of the systems and methods described herein. The database may store and maintain user information, transaction information, account information, and general information, for example.

The instructions and/or data used in the practice of various embodiments of the invention may utilize any compression or encryption technique or algorithm, as desired. For example, an encryption module can be used to encrypt data. Further, files or other data may be decrypted using a suitable decryption module, for example.

As noted above, in various embodiments of the invention, a user interface is provided to allow the user to interact with the server 200 through his or her computing device. The user interface may include hardware, software, or combination of hardware and software. The user interface may be in the form of a dialogue screen, for example. The user interface may also include or communicate with a mouse, touch screen, keyboard, voice reader, voice recognizer, dialogue screen, menu box, list, checkbox, toggle switch, pushbutton and/or any other device that allows a user to receive information regarding the operation of the server as it processes a set of instructions. Accordingly, the user interface may comprise or interface with any device that provides communication between the user, the server and/or the user's computing device. The information provided by the user to the server through the user interface may be in the form of a command, a selection of data, or some other input, for example.

It will be readily understood by those persons skilled in the art that the present invention is susceptible to broad utility and application. Embodiments and adaptations of the present invention other than those embodiments described herein will be apparent from the foregoing description, without departing from the substance or scope of the invention. Accordingly, while particular examples of the present invention have been described in detail herein, it is to be understood that this disclosure is only illustrative and exemplary of the present invention and is made to provide an enabling disclosure of the invention. The foregoing disclosure is not intended to limit the scope of the present invention or otherwise to exclude any other such embodiments, adaptations, variations, modifications or equivalent arrangements. The claims set forth below should be construed in view of the full breadth and spirit of the present invention.

The invention claimed is:

1. An access device for a plurality of accounts comprising:
   a body having substantially a credit card shape;
   a processor housed in the body;
   a memory in communication with the processor, wherein the memory stores information on a plurality of accounts;
   a selection device that allows a user to select one of the plurality of accounts;
   a first display for displaying an account number for the selected account;
   a second display that displays an account description;
   a third display that displays a CVV code; and
   a wireless transmitter and a wireless receiver in communication with the processor;
   wherein the processor retrieves at least some of the information on the selected account from memory and instructs the wireless transmitter to transmit at least some of the retrieved information on the selected account.

2. The access device of claim 1, wherein the account information is generated by a server based on input received from the user.

3. The access device of claim 2, wherein the user inputs account information through a website to the server.

4. The access device of claim 1, wherein the access device receives the account information from a mobile telecommunications device of the user.

5. The access device of claim 1, wherein the account information received by the wireless receiver of the access device comprises instructions regarding adding an account to the memory.

6. The access device of claim 1, wherein the account information received by the wireless receiver of the access device comprises instructions regarding denying access to an account stored in the memory.

7. The access device of claim 1, wherein the access device is disabled by instructions received through the wireless receiver.

8. The access device of claim 1, wherein the access device receives through the wireless receiver a complete copy of account information to be stored in the memory.

9. The access device of claim 1, wherein the access device receives instructions through the wireless receiver regarding updating a credit limit for a credit account stored in the memory.

10. The access device of claim 1, wherein the wireless transmitter transmits the at least some of the retrieved information on the selected account using radio frequency transmission.

11. The access device of claim 1, wherein the body has dimensions that are substantially the same as dimensions of a credit card.

12. The access device of claim 1, wherein the selection device comprises a debit button and a credit button.

13. The access device of claim 1, wherein the processor generates a machine-readable pattern in response to a user selecting one of the plurality of accounts using the selection device, and the first display displays the machine-readable pattern indicative of the selected account.

14. The access device of claim 1, further comprising a programmable magnetic strip that can be programmed by the processor to encode an account number.

15. The access device of claim 1, wherein the processor instructs the wireless transmitter to initiate a transaction.

16. The access device of claim 1, wherein the processor executes a security routine in which the user must enter a security code in order to gain access to the access device.

17. The access device of claim 1, wherein the access device receives the account information from a server via a fixed wireless transmitter.

18. The access device of claim 1, further comprising electrical contacts, in communication with the processor, that allow the access device to communicate with a chip reader.

19. A system comprising
an access device for a plurality of accounts comprising:
- a body having substantially a credit card shape;
- a processor housed in the body;
- a memory in communication with the processor, wherein the memory stores information on a plurality of accounts;
- a selection device that receives a user selection of one of the plurality of accounts;
- a first display for displaying information identifying the selected account;
- a second display that displays an account number; and
- a first wireless transmitter and a wireless receiver in communication with the processor; and a server that communicates with the access device and with the user;
wherein the processor retrieves at least some of the information on the selected account from memory and instructs the first wireless transmitter to transmit at least some of the retrieved information on the selected account;
wherein the server communicates with a second wireless transmitter and second wireless receiver that communicate wirelessly with the access device, and the server communicates with the user over a network.

20. The system of claim 19, wherein the network is the Internet.

21. The system of claim 19, wherein the second wireless transmitter and second wireless receiver are fixed in position.

22. An access device for a plurality of accounts comprising:
- a body having substantially a credit card shape;
- a processor housed in the body;
- a memory housed in the body and in communication with the processor, wherein the memory stores information on a plurality of accounts;
- a selection device housed in the body that receives a user selection of one of the plurality of accounts;
- a first display housed in the body; and
- a second display that displays an account number;
- wherein the processor generates a machine-readable pattern in response to the user selecting one of the plurality of accounts, and the display displays the machine-readable pattern indicative of the selected account.

23. The access device of claim 22, wherein the body has dimensions that are substantially the same as dimensions of a credit card.

24. The access device of claim 22, wherein the machine-readable pattern comprises a bar code.

25. The access device of claim 22, wherein the selection device comprises a debit button and a credit button.

26. The access device of claim 22, wherein the selection device comprises a rewards button.

27. The access device of claim 22, further comprising a third display that displays an account description.

28. The access device of claim 27, further comprising a fourth display that displays a CVV code.

29. The access device of claim 22, further comprising a programmable magnetic strip that is programmed by the processor to encode an account number.

30. The access device of claim 22, wherein the processor executes a security routine in which the user must enter a security code in order to gain access to the access device.

31. The access device of claim 22, further comprising a wireless transmitter and a wireless receiver housed in the body and in communication with the processor, wherein the wireless receiver receives information for the processor relating to one or more of the plurality of accounts.

* * * * *